May 30, 1967
E. C. SAINT-JACQUES
3,321,892
DUST FILTER APPARATUS
Filed July 31, 1963
3 Sheets-Sheet 2
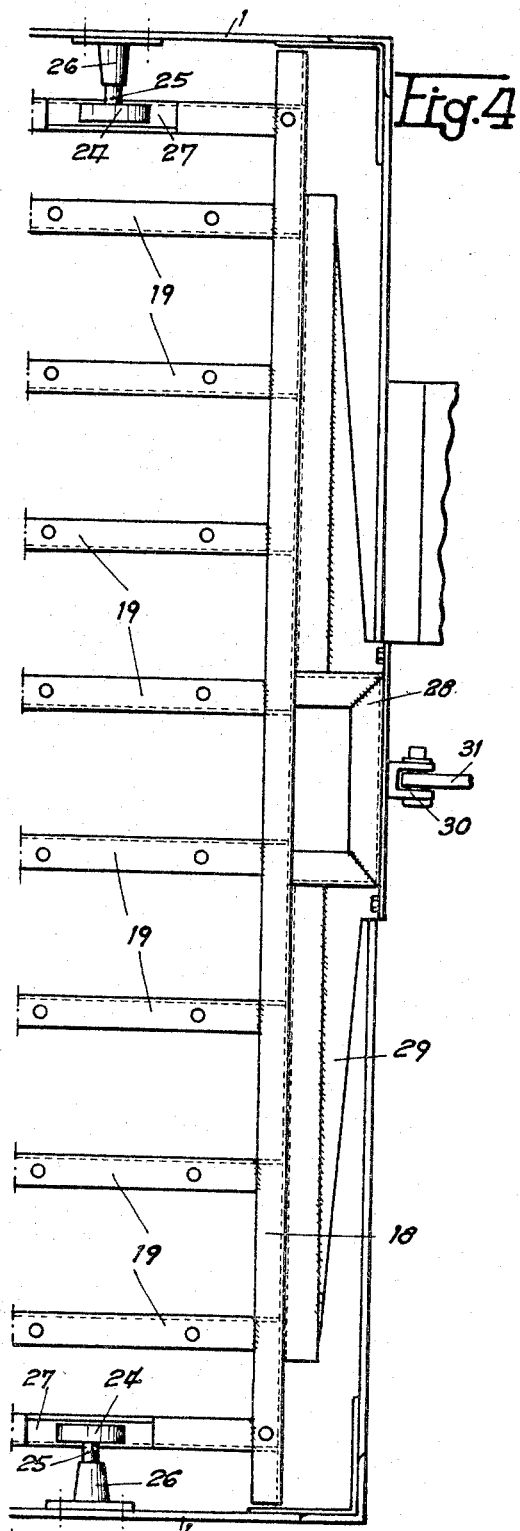
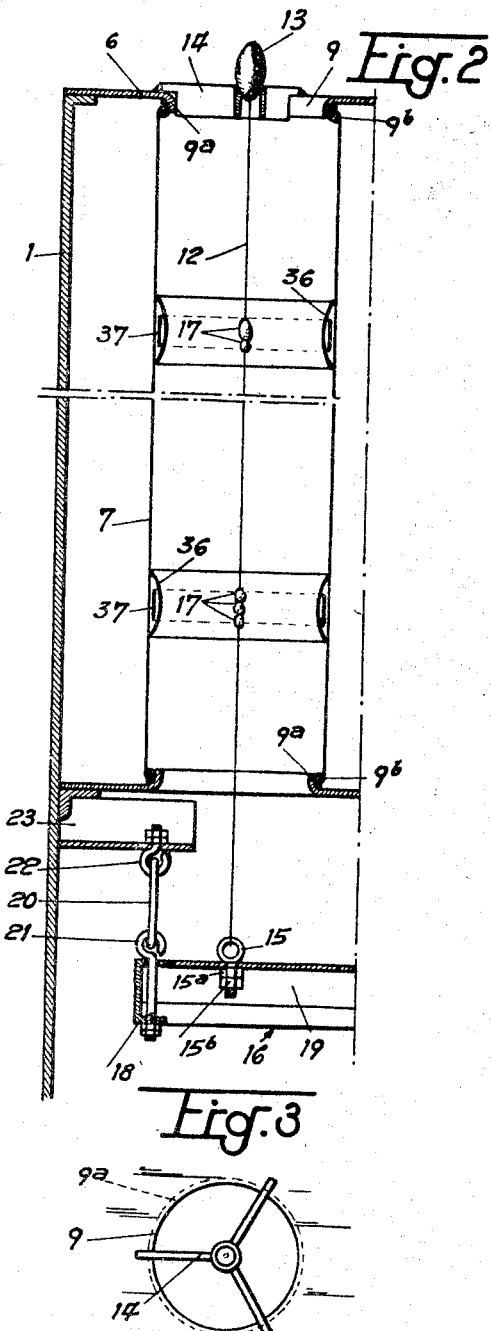
INVENTOR
EUGENE CAMILLE SAINT-JACQUES
BY
*Woodhams, Blanchard & Flynn*
ATTORNEYS May 30, 1967

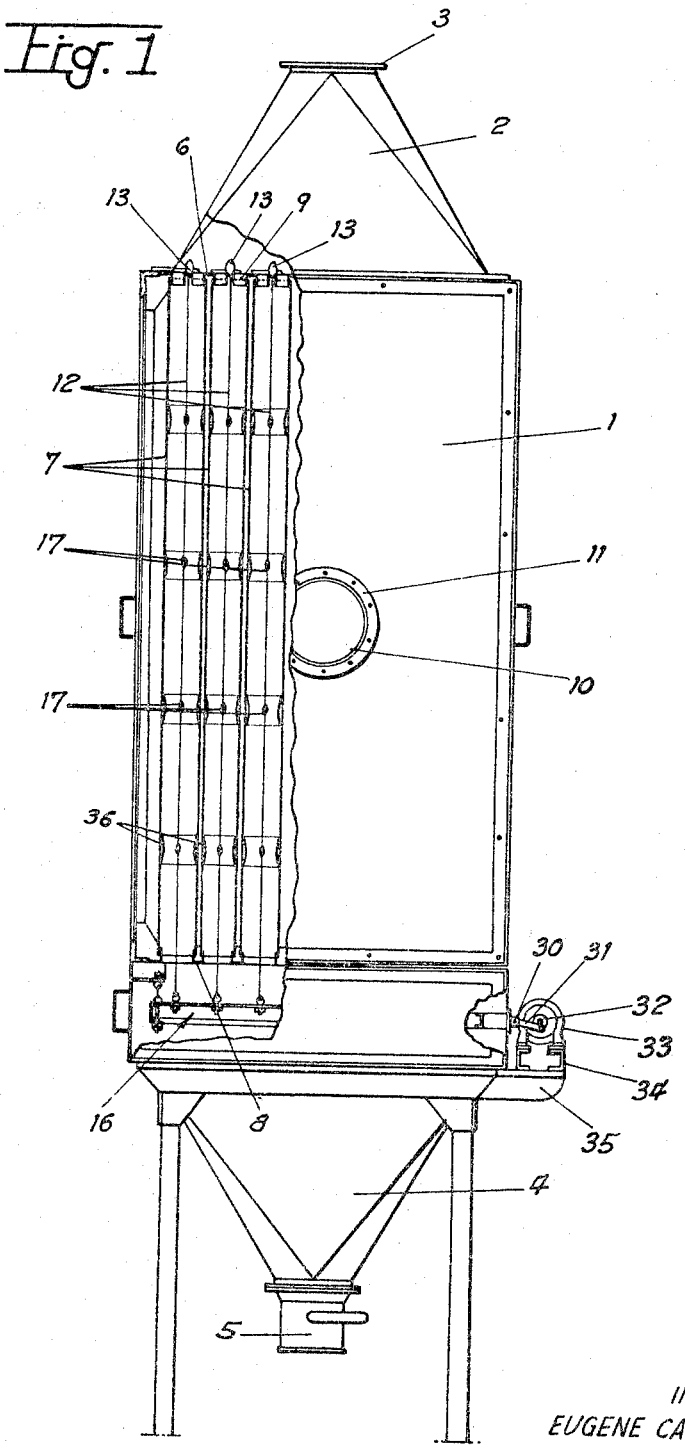

E. C. SAINT-JACQUES 3,321,892

DUST FILTER APPARATUS

Filed July 31, 1963

INVENTOR
EUGENE CAMILLE SAINT-JACQUES

BY
*Woodhams, Blanchard & Flynn*
ATTORNEYS

# United States Patent Office 3,321,892
Patented May 30, 1967

3,321,892
DUST FILTER APPARATUS
Eugene Camille Saint-Jacques, 59 Rue Saint-Lazare,
Paris, France
Filed July 31, 1963, Ser. No. 298,836
Claims priority, application France, Aug. 2, 1962,
905,893, Patent 1,390,159
8 Claims. (Cl. 55—299)

This invention relates to dust filters of the type comprising in one well-known form, a generally box-shaped casing having correspondingly-disposed apertures in its top and bottom walls, and tubular sleeves made of filter cloth stretched vertically between the pairs of apertures and connected therewith at their ends. A stream of dust-laden gas is delivered through an inlet conduit secured over the upper wall of the casing and communicating with the upper ends of the sleeves and is forced outwards through the walls of the sleeves to issue out of the casing by way of an outlet conduit connected with a side wall thereof. The gas in passing through the filtering walls of the sleeves is freed from its dust contents which cling to the inner surfaces of the sleeve walls, and the dust can be collected from the lower apertures of the casing in a suitable receiver provided thereunder.

In the operation of dust filtering devices of this kind, in common with other gas filtering systems using filter cloth, a difficult problem is encountered in connection with the necessary cleaning of the filtering sleeves from time to time to prevent their being clogged after a period of service. While various expedients have been proposed heretofore to effect such cleaning, intermittently during shutdown of the dust-filtering apparatus, or during operation of the latter, none has proved entirely successful practically.

Objects of this invention are to provide dust filter apparatus of the type specified with improved cleaning means operable in a continuous and/or automatic manner during operation of the apparatus, possessing very high efficiency, as well as mechanical simplicity and ruggedness and that will be cheap and economical to install and maintain.

In accordance with an aspect of the invention, there is provided in dust filter apparatus of the type specified, at least one flexible wire-like element extending substantially along the axis of each of the filter sleeves of the apparatus, said element being supported at its upper end from the top of the enclosure, vibration-generating means connected to the lower end of said wire-like element, and weight means attached to spaced points of said wire-like elements within said sleeve for repeated impact-making engagement with the inner surface thereof on operation of said vibration generating means.

It will be readily understood that with this arrangement the impacts produced by the weight means against the sleeve surface will efficiently unloose any dust particles clinging thereto which will then drop into the underlying dust collector.

Preferably the wire-like elements extending through all of the sleeves are connected at their lower ends with a common vibratory frame supported below the bottom wall of the box-like enclosure of the apparatus, and driven in horizontal reciprocation.

Reinforcing means are preferably provided around the wall of the filter sleeves in the annular areas that are to be impinged by the weight means in the operation of the device.

The above and further objects and features of the invention will be apparent from the following disclosure of an exemplary embodiment thereof illustrated in the accompanying drawings, wherein:

FIG. 1 is an elevational view, partly broken away, of the improved dust filter apparatus;

FIG. 2 is a partial vertical section on an enlarged scale showing one of the filter sleeves and illustrating the manner of attachment of the wire to the upper wall of the casing and its connection, at its lower end thereof, with the vibrator frame;

FIG. 3 is an overhead plan view of the upper attaching means;

FIG. 4 is a partial plan view, on an enlarged scale, showing the vibrator frame;

Figure 5:
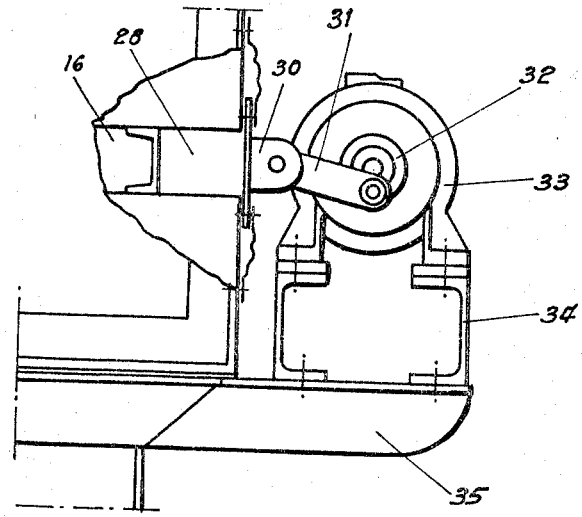
FIGS. 5 and 6 are views in elevation and plan respectively, of a vibrator device and its connection with the vibrating frame.

Referring to FIG. 1, the improved gas filter or dust-filter shown is of generally conventional construction and comprises a metallic casing 1 of box-like shape fitted at its top with an upwardly-tapered connector member 2 having a flanged opening 3 at its upper end for connection with an inlet conduit, not shown, for dust-laden gas to be filtered. At its bottom, the casing 1 is similarly provided with a downwardly-tapered connector 4 having means 5 at its lower end for suspending therefrom a bag, not shown, or other suitable receiver for collecting the dust separated from the gas stream.

The top horizontal wall 6 of the casing 1 is formed with spaced openings, to which are connected the upper ends of respective tubular filter sleeves 7 which extend vertically through the casing 1 and have their lower ends connected around corresponding openings formed in the bottom wall 8 of the casing. The connection of the upper and lower ends of the sleeves 7 with the upper and lower casing walls 6 and 8 may be effected in the manner shown in FIG. 2. As shown, the edge of each opening such as 9 is flanged inwards as at 9a, and a retainer ring 9b is supported around the flange and suitably secured thereto. The ends of the sleeve 7 are passed over the retainer rings and secured between the rings and flanges and the walls 6 or 8. The sleeves 7 are mounted in a substantially taut condition between their upper and lower ends.

In one of the side walls of the casing 1 (see FIG. 1) there is formed a gas outlet opening 10 provided with a flange 11 for connection with a clean gas outlet conduit, not shown.

In accordance with this invention, a flexible wire-like element 12, such as steel wire rope, extends substantially axially of such sleeve 7 and has its upper end supported at the centre of the corresponding opening 9. The supporting means may conveniently take the form shown in FIG. 2, comprising a metal knob or olive 13 fixed to the upper end of the wire 12 and supported over a short tube forming the central portion of a spider-type support 14 having e.g. three radial arms secured at their outer ends to the casing wall 6 around the aperture 9. At its lower end the wire rope 12 is attached by way of an eye-bolt 15 to one point of a vibratory frame 16 common to all the wire ropes and suspended therefrom underneath the lower perforate wall 8 of the casing. The construction of the vibratory frame will be described in greater detail later.

At suitably spaced points along the length of each of the wires 12 within the sleeve 7, weights 17 are fixed to the wire. Said weights may be in the form of metallic olives or knobs somewhat similar to fishing tackle sinkers, crimped around the wire. In operation, the wire elements 12 are allowed to retain some slack, so that when vibrated in the manner presently described, the weights 17 will repeatedly strike the inner surfaces of the sleeves 7.

As shown the filter sleeves 7 are internally provided, in the annular area surrounding each of the weights 17

(see FIG. 2), with reinforcing means in the form of annular bands 36 of strong wear-taking textile material. Between the band 36 and the inner surface of the sleeve there is interposed a ring 37 made of thin gauge metal strip (e.g. about 1 mm. in thickness), so that the impact produced by the weight 17, while being damped by the reinforcing band 36, will nevertheless be effectively transmitted to the material of the sleeve and cause the desired cleaning effect to be produced over a substantial vertical area of said sleeve above and below the point of impact. With this arrangement the filter cloth constituting the sleeve is protected against the damaging effect of concentrated shocks, and its useful life is prolonged, while at the same time the cleaning effect is improved.

Figure 6:
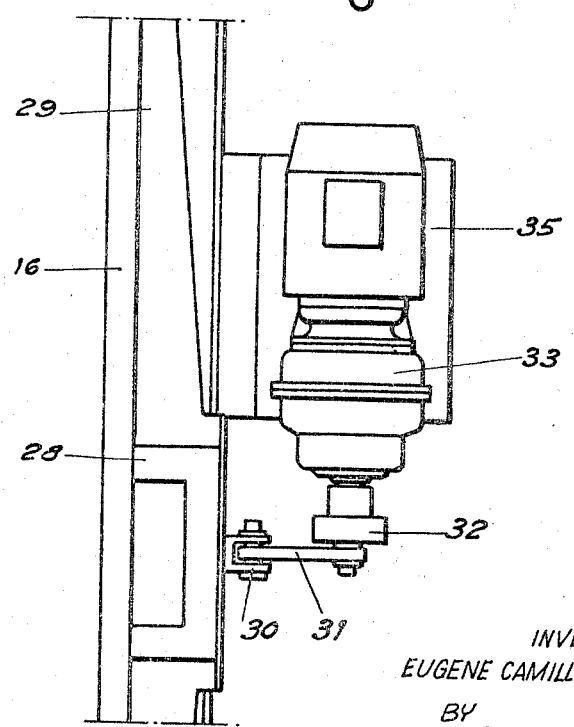

The vibratory frame 16 may comprise a pair of longitudinal channel members 18 interconnected by angle-section cross members 19 arranged in parallel spaced relationship (see FIG. 6) at spacings corresponding to the spacing between the rows of apertures formed in the top and bottom casing walls 6 and 8. The afore-mentioned eye-bolts 15 are attached to the cross members 19 at suitably spaced points thereof by means of nuts 15a and locknuts 15b. Means are provided for suspending the frame 16 from the casing frame 1 and comprise rings such as 20 (FIG. 2) engaging eye-bolts 21, 22 respectively secured to the longitudinal frame members 18 and to brackets 23 secured to the casing frame. Means are also provided for guiding the frame 16 during the horizontal vibratory movements imparted to it. The guiding means may comprise, as shown in FIG. 4, rollers such as 24 preferably in the form of sealed ball bearings, mounted on pivots 25 secured to brackets 26 projecting from adjacent walls of the casing frame 1, said rollers engaging runways 27 such as short angle sections secured to adjacent cross members 19.

Secured to a midpoint of the outer surface of one of the longitudinal members 18 of the vibratory frame, e.g. by way of a bracket 28 (FIGS. 5 and 6) provided with reinforcing ribs 29, is a fork 30 between the arms of which is pivoted one end of a link 31 the other end of which (also see FIG. 1) is pivoted to an eccentric crankpin 32 secured on the output of a motor reducer unit 33. This unit is secured on a support 34 mounted on a bracket 35 forming part of the apparatus frame.

The operation of the apparatus described will be apparent from the explanations previously given. The horizontal vibrations imparted to vibratory frame 16 through linkage 31, 32 are transmitted to the wires 12, causing the weighted wires to whip around so that the weights 17 strike the inner wall surfaces of filter sleeves 7 repeatedly at spaced areas along the lengths of said sleeves causing the dust collecting thereon to drop down into a bag or other receiver connected to the base 5 of the filter casing.

It will be apparent that various modifications may be introduced into the single embodiment illustrated and described without exceeding the scope of the invention. Thus, while the provision of a single multi-weighted wire disposed axially of each filter sleeve and provided with a series of spaced weights thereon, as described above, is the currently preferred arrangement, it would lie within the scope of the invention to provide a plurality of adjacent wires in each sleeve fitted with weights (one or possibly more per wire) at different levels. While the vibratory frame is here shown to be driven from mechanism imparting to it horizontal reciprocatory motions of substantially amplitude, said drive mechanism may be replaced by any suitable vibration-genetrating means, e.g. electrical in character.

What I claim is:

1. Dust filter apparatus comprising a casing, at least one open-ended sleeve made of filtering material stationarily supported in and extending vertically through the casing, an inlet for dust-laden gas connected with the top of the casing and communicating with the upper end of the sleeve, a gas outlet connected with a side of the casing and in communication with the zone within said casing outside of said sleeve, partition means at the top of the casing for preventing dust-laden gas bypass of the sleeve whereby gas circulating downwardly from the inlet through the sleeve and then laterally outwards through the sleeve material to the outlet will leave dust clinging to said sleeve material, and at least one wire-like element extending vertically through the sleeve and having at least one weight attached thereon between the ends of the sleeve, means suspending said wire-like element in the casing at the upper end thereof, and means disposed below the lower end of said sleeve and connected with the lower end of said element for imparting vibratory motion thereto to cause said weight to strike repeatedly the sleeve material and detach the dust therefrom, and means for collecting said dust from the lower end of said sleeve.

2. Dust filter apparatus comprising a box-like casing having top, bottom and side walls, said top and bottom walls being stationary and having correspondingly spaced apertures formed therein, tubular sleeves of filtering material extending vertically between the corresponding aligned apertures in said top and bottom walls, said sleeves being affixed to said top and bottom walls, an inlet for dust-laden gas connected with the top wall of the casing and communicating with the upper ends of the sleeves, a gas outlet connected with said side wall of the casing and in communication with the zone within said casing outside of said sleeve, at least one wire-like element extending through each sleeve, means suspending the upper ends of said elements from said top wall, the lower ends of said elements extending below said bottom wall, weights secured to each of said elements at a plurality of points spaced vertically at different levels within each sleeve, and vibratory means disposed below said bottom wall and connected with the lower ends of all said elements to impart vibratory motion thereto to cause said weights to strike the sleeve material and detach dust therefrom, and means communicating with the lower ends of said sleeves for receiving said dust.

3. Apparatus as claimed in claim 2, wherein there is a single wire-like element per sleeve having a plurality of spaced weights attached thereon.

4. Apparatus as claimed in claim 2 wherein said vibratory means comprises a common vibratory frame positioned below said bottom wall and having the lower ends of said wire-like elements attached thereto, means for supporting said frame for vibratory movement, and drive means connected to said frame for vibrating said frame.

5. Apparatus as claimed in claim 4, wherein said supporting means support said frame for horizontal reciprocatory movement and said drive mean comprises means connected to said frame to impart horizontal reciprocatory motion to said frame.

6. Apparatus as claimed in claim 5, wherein said supporting means includes roller means and cooperating guide means engaging said roller means, one of said roller means and said guide means being mounted on said casing and the other being mounted on said frame for guiding said frame in its said horizontal reciprocatory motion.

7. Apparatus as claimed in claim 2, having annular reinforcing means attached to the inner surface of each of the sleeves over the areas in horizontal alignment with said weights.

8. Apparatus as claimed in claim 2, wherein the means for suspending the wire-like elements from said top wall comprise spider supports having radial arms outwardly engaging the top wall of the casing adjacent each upper end of the sleeve, each spider support having an apertured central part, and a head member attached to the upper end of the element and resting freely on said part.

(References on following page)

References Cited

UNITED STATES PATENTS

| | | | |
|---|---|---|---|
| 534,068 | 2/1895 | Holland | 55—291 |
| 1,286,458 | 12/1918 | Warren | 55—300 |
| 1,336,600 | 4/1920 | Tuttle | 55—291 X |
| 1,509,912 | 9/1924 | Stebbins | 55—96 |
| 1,843,639 | 2/1932 | Hansen | 55—341 X |
| 1,959,752 | 5/1934 | Wintermute | 55—118 |
| 3,241,297 | 3/1966 | Hanes | 55—341 |

HARRY B. THORNTON, *Primary Examiner.*

B. NOZICK, *Assistant Examiner.*